3,362,917
POLYMERIC ORGANIC SEMICONDUCTOR
Stephen D. Bruck, Bethesda, Md., assignor to Research Corporation, New York, N.Y., a non-profit corporation of New York
No Drawing. Filed Oct. 12, 1965, Ser. No. 495,308
3 Claims. (Cl. 252—500)

ABSTRACT OF THE DISCLOSURE

A semiconductive material of high thermal stability is made by pyrolysing poly[N,N'-(p,p'-oxydiphenylene) pyromellitimide] in vacuum at a temperature of from about 700° C. to about 900° C. for at least about one hour.

This invention relates to novel semiconductive organic pyrolysates and a method of making them and particularly to the production of semiconductive substances of high thermal stability by the pyrolysis of poly[N,N'-(p,p'-oxydiphenylene) pyromellitimide]. This material is also known as "H"-film of E. I. du Pont de Nemours and Company.

I have found that when poly[N,N'-(p,p'-oxydiphenylene) pyromellitimide] is heated in a vacuum at temperatures of from about 700° C. to about 900° C. for periods of the order of an hour or more solid pyrolysates are formed which no longer show detectable electron paramagnetic resonance absorption in contrast to the samples which are pyrolyzed at lower temperatures and have specific resistivities, decreasing with increasing temperature of heating, in the range from about 10 ohms per cm. to about 0.05 ohm per cm. The products obtained by heating in this temperature range have good thermal and dimensional stability at temperatures in excess of 900° C. The rate of decrease of specific resistivity with temperatures of pyrolysis falls off rather rapidly above about 800° C. while the structural strength of the pyrolysates tend to decrease substantially at pyrolysis temperatures above about 850° C., so that, in general, the preferred temperature of pyrolysis is in the range from about 800° C. to about 850° C.

It is believed that the conductivity of the pyrolysates of the invention is due to increased mobility of current carriers in the solid pyrolysates brought about by molecular reorganization and fusion processes at temperatures in the ranges specified which result in enhanced pi-orbital overlap. However, the mechanism of conduction of the new pyrolysates is not known with certainty. The utility of the invention is independent of any particular theory for the mechanism of conduction.

The degree of vacuum is not critical, it being only desirable to remove baseous and vaporous products of pyrolysis rapidly from the heating zone.

The principles of the method of the invention are illustrated by the following description of methods of producing samples of the pyrolysates of the invention for testing their properties:

For pyrolysis and E.P.R. absorption studies approximately 32 mg. film (0.002 inch thick) samples of poly[N,N'-(p,p'-oxydiphenylene) pyromellitimide] were used. The film sample (cylindrical in shape) was placed in a quartz tube (length: 12 in., outside diameter: $\frac{3}{8}$ in.) which was equipped with a vacuum stopcock and a joint for connection to a high vacuum manifold. After evacuation to a pressure of approximately $5 \times 10^{-6}$ torr, a preheated electric furnace was raised and the sample pyrolysed for specific periods. Accurate temperature control of $\pm 1°$ C. was maintained by means of chromel-alumel thermocouples and an electronic thermoregulator. At the end of the pyrolysis the vacuum stocpcock was closed and the tube containing the pyrolysed sample was placed in a Dewar flask filled with liquid nitrogen.

The E.P.R. absorption measurements were conducted within one to three hours after the completion of the pyrolysis. The evacuated quartz tube was transferred from its storage Dewar flask into a Dewar assembly containing liquid nitrogen and situated between the poles of the electromagnet of the microwave equipment. The E.P.R. absorption measurements were carried out at a frequency of 9,140 mc./s.

Specific resistivity measurements were carried out by the radio frequency induction method (50 mc./s.) at atmospheric pressure and at room temperature, as described by Poehler and Liben (Proc. Inst. Elect. Electron Engrs., 1964, 52,731). In order to utilize fully the induction method it is essential that the film samples be reasonably flat. Therefore, pyrolysis experiments were carried out in a quartz tube equipped with a quartz plunger. The weight of this plunger prevented the film samples from "curling up" during the pyrolysis and facilitated the retention of their original flat shape.

Typical specific resistivities at 25° C. are about 10 ohms per cm. for material pyrolysed at 700°. C. per 1 hour, $9 \times 10^{-2}$ ohms per cm. for material pyrolysed at 800° C. for 1 hour and $5 \times 10^{-2}$ ohms per cm. for material pyrolysed at 850° C. for 1 hour.

Since the shape of the original polymer is preserved in the pyrolysis, the polymer maybe formed into the desired shape such as films, filaments or the like prior to pyrolysis or it may be applied as a layer on substrate of suitable character and shape, such as a quartz sheet or filament.

I claim:
1. A method of making semiconductive material of high thermal stability which comprises pyrolysing poly [N,N'-(p,p'-oxydiphenylene) pyromellitimide] in vacuum at a temperature of from about 700° C. to about 900° C. for at least about one hour.
2. A method of making semiconductive material of high thermal stability which comprises pyrolysing poly [N,N'-(p,p'-oxydiphenylene) pyromellitimide] in vacuum at a temperature of from about 800° C. to about 850° C. for at least about one hour.
3. A semiconductive thermally stable solid characterized by a specific resistivity in the range of from about 10 ohms per cm. to about 0.05 ohm per cm. at about 25° C. made by the pyrolysis of poly[N,N'-(p,p'-oxydiphenyl) pyromellitimide] in vacuum at a temperature of from about 700° C. to about 900° C. for at least about one hour.

References Cited
UNITED STATES PATENTS
3,073,784   1/1963   Endrey _____ 252—518

LEON D. ROSDOL, *Primary Examiner.*
J. D. WELSH, *Assistant Examiner.*